United States Patent [19]
Baker et al.

[11] Patent Number: 6,106,399
[45] Date of Patent: Aug. 22, 2000

[54] INTERNET AUDIO MULTI-USER ROLEPLAYING GAME

[75] Inventors: Keith Baker, Boulder; John Blakely, Louisville; Mark Cieslar; Robert Creamer, both of Boulder; Jonathan Laff, Longmont; Daniel Russet; Scott Strbik, both of Boulder, all of Colo.

[73] Assignee: VR-1, Inc., Boulder, Colo.

[21] Appl. No.: 08/876,939

[22] Filed: Jun. 16, 1997

[51] Int. Cl.[7] .................................................. A63F 9/22
[52] U.S. Cl. ........................................................... 463/42
[58] Field of Search .......................................... 463/40–43

[56] References Cited

PUBLICATIONS

Copyright 1995 Computer Games Strategy Plus see pages, 12,54,55,74, 75 and Product inserts May 1995.

Primary Examiner—Valencia Martin-Wallace
Assistant Examiner—Sheila Clayton
Attorney, Agent, or Firm—Holme Roberts & Owen LLP

[57] ABSTRACT

The present invention relates to the use of client and server software communicating with each other via the internet to create and maintain a multi-user role-playing game. The virtual world of the game is presented to each user by means of text and dimensional audio. The virtual world of the game is infinitely expandable and updateable, and the software reacts to user inputs to make the virtual world change according to user actions. New users may join an in-progress game at any time.

21 Claims, 4 Drawing Sheets

INTERNET AUDIO MULTI-USER ROLEPLAYING GAME

BACKGROUND OF THE INVENTION

1. Field of the Invention

The present invention relates to a computer game which is played on the Internet and which allows multiple users (up to 1,000) to play the game at the same time. Specifically, the game falls into the genre known as MUD ("Multi-User Dungeon"), MUSH ("Multi-User Shared Hallucination") or MUSE ("Multi-User Shed Environment"), and is enhanced by various features including the use of three-dimensional sound.

2. Description of the Prior Art

Multi-user text based computer adventure games have their origins in interactive literature and both live and tabletop roleplaying games. During the course of their development to date, they have also absorbed certain features from text-based computer adventure games, graphic adventure games and computer roleplaying games, all of which are single-player games.

Interactive Fiction and Gamebooks

"In the 1960s experimental writers like Raymond Queneau and B. S. Johnson produced texts with multiple possible plots arranged in separate sections to be shuffled or selected by the reader. Michael Moorcock did much the same thing on a larger scale with the Jerry Cornelius quartet, designed to be read in any order.

The idea of turning this into a game rather than an artistic statement about the randomness of the universe came with State of Emergency, a 'Programmed Entertainment' by Dennis Guereier and Joan Richards, published by Penguin in 1969. You-the-reader join cabinet meetings and top-level political discussions in 'the newly independent Republic of Lakoto', and have several (but not very many) chances to make important decisions about hydro-electric power schemes, representations to the UN, and whether quietly to assassinate a dangerous general."

from *Solo Voyages* by Graeme Davis and Colin Greenland, *Imagine* magazine No. 22, January 1985

Edward Packard's *Deadwood City,* published in 1979, presents the reader with a choice at the end of each page, leading to a large number of possible outcomes.

Solo adventures for tabletop roleplaying games were published in the late 1970s and early 1980s for Tunnels & Trolls (Flying Buffalo) and The Fantasy Trip (Metagaming), and later for several other roleplaying games, including Dungeons & Dragons (TSR). 1982 saw the publication of the first gamebook to include simple game rules, *The Warlock of Firetop Mountain,* and by the mid-1980s there were many titles available, both in gamebooks and in interactive storybooks (the distinction being that the former involved some game rules and statistics, while the latter was based purely on the reader choosing options). *Fighting Fantasy* (Puffin) and *Lone Wolf* (Berkeley Books) were the most successful of the gamebooks, while Bantam's *Choose Your Own Adventure* series was the most prolific interactive storybook series.

Computer Text Adventures

The format of interactive stories and gamebooks is very easily transferred to a computer environment, and computer text adventures can offer the user a wider range of actions by parsing text commands ("turn left", "attack dragon with sword", "listen at door", etc.) instead of offering the limited menu of choices available in their print-based counterparts ("if you take the left-hand passage, turn to paragraph 166. If you take the right-hand passage, turn to paragraph 342.").

*Adventure,* written by Crowther and Woods in 1970, is generally held to be the first text-based computer adventure game (*Multi-User Dungeons* by Alan Cox and Malcolm Campbell, *Interactive Fantasy* 1.2, Winter 1994). For home computers, Infocom's *Zork* series from the 1980s is widely regarded as classic examples of the genre.

Like interactive stories and gamebooks, computer text adventures are a single-player experience. They offer only a limited number of choices, with a default "I don't understand" response to any user input that is outside the range of available choices. They do not offer a dynamic game world in the true sense, since a player who starts the game anew will find things unchanged by any previous play sessions.

Tabletop Roleplaying Games

The first tabletop roleplaying game ("RPG") was Dungeons & Dragons, published in 1973 by TSR Inc., and it was quickly followed by a number of imitators. This genre of games developed out of tabletop wargaming, but allow each player control of one character rather than a number of units of troops. In terms of game mechanics, each character is represented by an array of statistics representing strength, speed, fighting skill, and other important qualities.

The players' characters ("PCs") co-operate to overcome enemies and hazards, with "the rest of the world" controlled by a referee ("Dungeon Master", "Game Master"), who also has the final say on the interpretation and application of the game's rules. Dungeons & Dragons is based in a fantasy setting influenced by mythology, folklore and the fantasy fiction of authors such as J. R. R. Tolkien, Robert E. Howard and Michael Moorcock. A typical game session would involve the PCs exploring an underground complex ("dungeon", in the usage of roleplaying games), fighting monsters, evading traps and hazards, and achieving a goal such as ridding the place of monsters, rescuing a kidnapped princess or recovering a legendary treasure.

The players verbally inform the referee of the actions they intend their characters to take, and the referee determines success, failure and any other outcomes using dice, the game's rules and a written description of the scenario. Sometimes models are used to reflect tactical situations, but this not strictly necessary. Players are rewarded for successful play by being given the ability to improve their characters' game statistics. Because of the co-operative nature of play there is no winner as such, and the goal is to build an ever more powerful character. A player whose character is killed must create a new character in order to keep playing.

As tabletop roleplaying games developed over the next decade, various other settings were used, including science fiction, horror and historical settings. The genre broadened to include less combat-oriented games such as Chaosium's Call of Cthulhu, where player characters have to solve a mystery by relying on investigative skills and successful interaction with non-player characters ("NPCs") controlled by the referee. Some games have more in common with interactive storytelling than with the tabletop wargames from which roleplaying games sprang.

In theory, there is no upper limit to the number of players in a tabletop roleplaying game, but in practice a game with more than ten players becomes difficult for a referee to manage, and the most common number of players is 4–8. Players must normally be present in the same location in order to participate in a game. The game world is dynamic—at least in better-managed games—and changes permanently in response to players' actions. Because players interact with the game through a human moderator who has the ability to interpret the game's rules and apply them to situations as they arise, a wide range of player actions is possible.

Live Roleplaying Games

Live roleplaying (also known as Interactive Literature) is best described as "a play without a script". Examples of Interactive Literature are the *How to Host a Murder* line of games, and the *Mind's Eye Theater* games published by White Wolf Game Studios. In an Interactive Literature game, each player receives a detailed information packet describing the scenario of the game and the background of the character the player will be portraying. The game itself is a tightly-woven story—a murder, a galactic peace conference, midnight at Denny's—where each character has certain goals, important information, and a connection to some of the other characters in the game. The game runs for a set period of time. Once it begins, the action is controlled almost entirely by the players. If the game is a murder mystery, the players may catch the murderer, accuse the wrong character, or all die horrible deaths, one by one If it's a galactic peace conference, the participants will have various demands and issues to be resolved—maybe they will come to a peaceful agreement, or maybe there will be war. It all depends on the actions of the players.

Live roleplaying games require the presence of all participants in the same location, and the participation of one or more human moderators. They offer a dynamic game world, but are not persistent, commonly lasting for a day or at most a long weekend.

Computer Roleplaying Games

The peak of popularity of tabletop roleplaying games in the mid-1980s coincided with the spread of home computers and the birth of the entertainment software industry in its present form, and many attempts were made to translate the experience of a tabletop roleplaying game to a home computer.

Computer roleplaying games are distinguished from other computer adventure games chiefly by the requirement for the player to create a character or a group of characters by choosing ability scores, equipment and other attributes, in imitation of the character generation process that takes place in a tabletop roleplaying game. Unlike tabletop roleplaying games, however, they remain a single-player experience, and their only concession to the idea of a dynamic game world is the option offered to the player to save a game at any point and return to it later. Like other kinds of computer adventure game, success is achieved more by finding the correct path through the pre-programmed obstacles and hazards, and reaching the end of the story.

Notable computer roleplaying games include SSI's series licensed from TSR's Advanced Dungeons & Dragons tabletop roleplaying property (e.g. Pool of Radiance), Origin Systems' Ultima series, and more recently Blizzard Entertainment's Diablo.

Computer Graphic Adventure Games

Graphic adventures are very similar to text adventures, but offer a more user-friendly graphical interface. Player input is normally by pointing and clicking with the mouse, and player feedback is provided by playing animations (normally 2D sprites against 2D backgrounds in a third-person side view), accompanied by pre-recorded dialogue presented as screen text and audio. For example, clicking on a door might cause the main character to walk to the door, and perhaps offer some observations about it ("it's locked", "it looks very flimsy", etc.); in some games, a list of actions which may be taken in regard to the door might also be displayed in the command area of the screen.

Graphic adventures are a single-player experience, and victory is achieved by guiding the character through the correct sequence of actions to solve all the problems set by the game's designers, and reach the end of the story. The game world is neither persistent nor dynamic, except in so far as the player may save a game in progress and return to it later.

Lucasfilm Games and its successor company LucasArts have produced many graphic adventure games that are regarded as classic examples of the genre. These titles include Maniac Mansion, Monkey Island, Indiana Jones and the Fate of Atlantis, Day of the Tentacle, Sam and Max Hit The Road and Full Throttle.

Multi-User Computer Role-Playing Games

"From quite early in the history of interactive multi-user computing, systems supported 'conferences' where people could talk together. Each message scrolled up the display, tagged with the sender's name. While intended for serious long-distance discussions, they rapidly acquired recreational uses too . . .

. . . While not the first such game, MUD1 which ran at Essex University was probably the greatest initial influence on the development of MUDs, including giving the genre its name . . .

. . . The Essex MUD was played from numerous sites other than Essex as the ARPANET and the UK academic network took shape . . . Its impact on the rest of the world was, however, muted by the fact that it wasn't freely available as source code.

Late in 1987 I was a student at the University College of Wales in Aberystwyth, and along with a few other Essex MUD players got involved in a project that later became known as AberMUD. Two unplanned events occurred that ignited the explosion of MUDs on the internet. Firstly we ported the game to a Unix system, and secondly someone asked us for a copy. We released it with a license that allowed free non-commercial use."

from Multi-User Dungeons by Alan Cox and Malcolm Campbell, Interactive Fantasy 1.2, Winter 1994.

Multi-user computer roleplaying games are known by a variety of acronyms, which normally indicate stylistic rather than technical differences. The majority of these games fall into two broad categories. Multi-User Dungeons, or MUDs, favor action and combat, with players fighting monsters and even other players in the effort to become ever more powerful. By contrast, a Multi-User Shared Hallucination (MUSH) or Multi-User Shared Environment (MUSE) places more emphasis on nonviolent interaction between players. Some become intensely political as players plot and compete for influence, while others are closer to group storytelling than to a competitive game.

Apart from the shared characteristics of supporting multiple players over a network or the internet, and allowing each player a single game persona or character, the games in this genre are various in the extreme. Some are entirely human-moderated, and others are computer-moderated to varying degrees. Some are entirely text-based, and some use graphics and sound to varying degrees. Some are commercial, and some are not A list of MUDs and similar games may be found in the USENET newsgroup rec.games.mud.misc. Gemstone III, a text-based MUD, is one of the most popular games on America Online's Games Channel One of the most noteworthy recent commercial releases in this genre is 3DO's Meridian 59, which offers limited sound and some graphics. Forthcoming titles like Origin's Ultima Online are moving increasingly in the direction of more sophisticated graphics.

None of these games matches the capabilities of the present invention, where the game is an Internet audio multiuser roleplaying game, with interactive text enhanced by 3D audio capabilities whereby the player is fully immersed in a constantly changing and expanding virtual world.

SUMMARY OF THE INVENTION

The present invention relates to a multiplayer Internet role-playing game that may be played by up to 1,000 players simultaneously, using a mixture of text and 3-dimensional audio to create a virtual environment within which the players can interact.

The present game offers a choice of two linked environments—one with a bias toward combat and the other with a bias toward social interaction—comprising a dynamic and persistent game world which develops over time according to player actions.

The game uses a client-server architecture with specialized client software designed specifically for the game. Most games of this type are built to work on generic text based client applications such as telnet Some specialized MUD and MUSH clients have been developed to work with multiple MUDs and MUSHes, but have not been designed for a particular game A specialized client application permits various enhancements to the game, including having 3D sounds using Microsoft's DirectSound3D, and a user interface that changes to reflect the player's current state in the game. It also permits improvements over how data is passed between client and server, such as caching long object and sector descriptions on the client so that they only have to be sent once, and extensive client-side error checking on player commands to avoid sending some data at all.

The game is a text based role-playing game with a unique system of 3D sound. Sectors of the world (For example, rooms in a building) are still the basis for movement as in any other text based role-playing game. Directional movement commands still move players from sector to sector. A 3D coordinate system within each sector records the positions of the objects within that sector. Sounds are then generated according to the positions of the objects emitting them. The server keeps track of which sounds are currently playing in each sector of the game world, and then passes that information to the client with coordinates relative to the player's position within the sector. The client plays the sounds accordingly. Additionally, the server keeps track of the direction a player's game persona is facing, so that if he moves north, he will hear sounds to the west on his left and to the east on his right, and vice versa if he moves south.

The following sound-type functionality is built into the sound system:

Sector-only sounds: these are sounds attached to an object which can only be heard by players in the same sector.

Loud sounds: these are sounds attached to an object which can be heard by players in the sector containing the object, and all adjacent sectors to that sector.

Sector-based sounds: sounds which exist in a sector but are not attached to an object, although they may be played at a specific position within the sector.

Environmental sounds: non-3D sounds used to produce ambiance within a sector or a group of sectors. These are sounds generally not associated with a specific position within a sector (i.e. the wind, crickets chirping at night).

Looping sounds: sounds that play continuously.

Intermittent sounds: these are sounds that continually repeat, with a delay between each repetition. The delay is random number generated from a specified range. This is used for repetitive sounds that occur occasionally, such as a bird chirping or a dog barking.

Moving sounds: sounds that move on a predetermined path relative to the object's position on the server. A fly buzzing around your head is implemented this way. While the fly object on the server remains at position (x,y,z), the client is updating its sounds position in a circular path around that point so that it appears to the player that the fly is quickly moving around in a circle.

Sound dampening: a sound's volume can be dampened to reflect obstructions between the player and the sound source. A sound on the other side of a cement wall for example, will sound much quieter than a sound at the same position with nothing obstructing the sound waves.

Sound fading: sounds can be faded in and out When a player goes from one sector to another with different environmental sounds, the sound in the sector he is leaving is faded out and the sound in the sector which he is entering is faded in, giving the impression of a smooth transition from one sector to another, even though the player's position is changing instantaneously on the server.

Smooth sound updating: when a sound's position relative to a player is changed, the client smoothes the transition so that change in position sounds as it would if the object were moving along a path, rather than jumping from point to point If, for example, the server tells the client to update a sound from point a to point b, the client will perform an interpolation between points a and b, updating the sound on several points along a line between a and b on a scale small enough so that the transition sounds smooth, as if the player were really moving to a new position.

Frequency variation: the client has the ability to vary the frequency that sounds are played so that we may use the same sound file to produce similar but different sounds (for example, the sound of a dog barking may be speeded up for small dogs and slowed down for large dogs), and thus preserve disk space.

The game world is infinitely updateable, and can be enhanced on an ongoing basis by additions including, but not limited to, new weapons, resources and other game units, new play options, and game-world events which do not result from player actions: including, but not limited to, planned events relating to the unfolding of a background story, and unconnected events comparable to the drawing of a "chance card" in a family boardgame such as Monopoly.

The game world is persistent it grows and changes over time, and there is no fixed beginning or end to a game. New players can join a game in progress at any time, and do not need to wait for the start of a new game. Once a game has started, it can continue indefinitely.

Example of a Game Setting

To illustrate the possibilities of this invention, an example of a game setting is described below, using the title Crossroads. A possible theme for the game is a virtual world filled with conspiracies and factions, and the dream world adjacent to it.

Concept

Crossroads draws players into a world of conspiracy and intrigue, reminiscent of The X-Files, The Twilight Zone, and The Sandman. At a first glance, it seems just like the everyday world. But in the shadows, there is far more going on than meets the eye. Powerful conspiracies compete for control of city resources. Enigmatic government agencies carry out classified experiments. There are rumors of alien infiltrators, mystic cults, temporal warps, and far stranger things. And there is another level, not visible at first The dreams of the City's inhabitants overlap. Some believe that the city is a nexus, a gateway to a dimension humans can only touch in their dreams. Those who explore the Sleeping Realms can find fantastic treasures, strange new powers, and horrible monsters. Dreams can quickly turn to nightmares . . . .

Crossroads is a text-based roleplaying game, which should support a thousand players per iteration. Crossroads will be the first MUD to incorporate sound as an integral part of the game. Ambient sound and other effects will make Crossroads an intensely immersive experience. An innovative 3-D coordinate system will provide fully three-dimensional sound, and track objects and locations far more effectively than current MUDs. In addition, the City will be a dynamic world with tremendous depth. Using techniques from live role-playing and other forms of interactive literature, the game will draw the players into a complex, fascinating role-playing experience unparalleled by any other MUD on the market.

Gameplay

Crossroads provides many different levels of gameplay. These include:

Political intrigue, espionage and mysteries in the waking world of the City. Every player has connections to one or more of the secret societies operating in the shadows of the City, and each faction has its own schemes and plans.

Action and adventure in the dreams of the City. The world of dreams is a fantastical place with many challenges to overcome. As players explore the dream world, their avatars can develop a wide range of psychic powers. The true nature of the Sleeping Realm is a mystery in itself; power and influence in the dream world can result in greater power in the waling world, as well.

Embedded games are linked to status in the City, and give players an opportunity for direct competition in the waking world.

In addition to the game elements, Crossroads will be a social environment providing ample opportunity to meet new people and chat about any subject that comes to mind. Given the present-day setting, players do not have to "break character" in order to talk about TV, sports, politics or any other subject.

Getting Started

When a player first connects to Crossroads, there is a choice of two game modes: The Sargasso Café a short-term introductory game, and Crossroads, the full open-ended game. Each mode has certain advantages.

Players who have no previous MUD or MUSH experience will want to start out in the Sargasso Café. The Café is miniature version of the game, an introductory setting designed to help new players learn their way around the engine and the game setting. A player who connects to the Sargasso Café receives a pregenerated character with a brief history and a concrete goal which should be able to be accomplished within one hour of play time. The player is then dropped into the Sargasso Café, a hotbed of intrigue and action. To accomplish his or her goal, the player will have to interact with the other patrons of the Café—all of whom have hidden agendas of their own.

The difference between The Sargasso Café and Crossroads is that characters in Crossroads have open-ended goals. Accomplishing a task or solving a mystery will lead to additional mysteries or create new opportunities. In the Sargasso Café, a player is given a simple task, and when the character has accomplished this goal, that's as far as it goes. The player may learn about new plots or mysteries, but he won't be able to follow those leads in the Sargasso Café. The Sargasso Café will give players a taste of the world, so they will want to progress to the full game. Of course, some players may choose to return to the Sargasso Café again and again.

When a player first connects to Crossroads, he or she must create a new character. First, the player must answer a few simple questions which identify his or her general areas of interest- science fiction, political intrigue, supernatural horror, etc. This will ensure that the player's character will become involved in the kind of plots that the player will find interesting. The player then selects the name and gender of the character, and works through a quick list to determine the character's appearance—hair and skin color, body type, etc.

The next step is to select traits for the character. The player is shown a list of possible traits (for example, Athletic, Sneaky, Perceptive). The player chooses two or three traits which will reflect the character's particular, and one trait which is a weakness. A character might be a wealthy academic who is clumsy, or perceptive but a poor athlete. These traits determine the character's special abilities, and may affect the way certain objects or computer-controlled characters react to the character.

Finally, the player selects a faction to which the character belongs. The player is presented with brief descriptions of a few of the secret societies and conspiracies that are active in the City. These descriptions do not mention the name of the group, so the player cannot find out any useful information about factions other than the one which the character joins. Sample descriptions might be "An international conspiracy using advanced technology to achieve world domination", "A government agency working to expose alien infiltration", or "A secret society manipulating the dreams of the City". This menu only includes a few of the factions in the game; this list is determined by the player's choice of traits and area of interest For example, the Men in Blue only accept athletic characters with an interest in science fiction.

The game software then compiles all of the information about the new character and generates a character sheet The player receives additional information about his or her chosen faction, together with details of the character's abilities and equipment, a brief description of the characters history, and a few clues about what is really going on in the City.

At this point the player is ready to enter the game. The player can try to contact the other members of the character's faction, follow up on some of the leads from the character sheet, or just find someone to talk to.

Example of Character Generation

Julian has played a few characters in The Sargasso Café. He enjoys the overall game experience, but after a few sessions, he begins to get frustrated with the temporary nature of the game world. So he decides to give Crossroads a try. Following the instructions provided in The Sargasso Café, Julian connects to Crossroads. The server checks and determines that Julian has not played before and routes him to the Character Generation system.

First Julian is asked a few questions, to help the game match him with a suitable character. The program asks what genre he prefers: Modern Drama, Science Fiction, or Fantasy. Julian selects Fantasy. Next, the program asks what activities he'd like to be involved in, out of the following list Espionage, Political Intrigue, Combat, and Socializing (Chat). Julian can select any or all of these four choices; after considering, he leaves out combat Finally, the program says that there are a few non-human characters in the game—if one was available, would Julian want to play a non-human character? The options are yes and no; after considering, Julian selects no. Being human is good enough for him.

Now the program moves on to actually making the character. First Julian has to pick an archetype, establishing the basic nature of his character. After some consideration, he decides to be a Snoop, a sneaky character who's always sticking his nose where it doesn't belong. Unknown to Julian, this modifies his character's basic statistics. His Subterfuge and Perception are increased, while his Strength and Stamina are lowered slightly. He gains two special abilities, Sneak and Advanced Eavesdropping. Now Julian has to select 4 points of advantages and two points of flaws. He decides to be Charming and Clever, but Poor. These traits further modify his basic statistics, increasing his Charisma, Subterfuge, and Perception, while lowering his Wealth. Because of the combination of his traits with his archetype, he gains two more special abilities, Fast Talk and Pick Lock.

Next, Julian has to select a Faction. The program checks his preferences and archetype, and produces a list of choices. He selects a faction described as "An international conspiracy using dream manipulation to further its aims." This Faction is the Codex, an arm of the Division. This further modifies Julian's basic statistics, increasing his Willpower and Wealth. He will also receive additional bonuses when he enters the dream world. Of course, all of these modifications occur in the background. Right now, what Julian knows is that he is a clever, charming snoop without much money, who is working for a mysterious conspiracy.

Now, there is one final step. Julian is presented with a quick set of options to determine his physical appearance: Gender, age, height, build, hair, eye and skin color. He decides that he will be a young Caucasian male, tall and slightly built, with red hair and blue eyes. He is prompted to select a name, and chooses "Oliver Smith".

At this point, the character is complete. The program runs through a checklist, assembling a brief history for Julian's character, Oliver. His history draws on what we already know about Oliver, and might sound something like this:

You've always been nosy. As a child, your curiosity managed to get you into all kinds of scrapes. (Snoop archetype) But no matter how much trouble you got into, you always managed to get out of it using your wit and charm. (Clever, Charming) When you were twelve, you thought that you met a ghost while you were poking around a condemned building. This sparked an interest in the supernatural which remained with you as you grew older. You continued to study the supernatural, and did some reporting for a ghost-spotter's tabloid called "Words from Beyond." (Fantasy interest) During this time, you were approached by a woman named Natalia. She had followed your stories, and told you of a secret brotherhood dedicated to the study of the unknown and the use of mystical knowledge to gain power in the real world. She invited you to become a part of this organization, and so it was that you became a member of the Codex. Faction: Codex)

You've been working for the Codex for a few years now. The pay's good, but you've never been able to hold on to money. (Poor) Your work for the Codex has included a fair amount of research, but you've also spent time on the front lines. You spent years in Peru, investigating the ancient temples there. You scoured the Universities of New England, stealing the ancient tomes you couldn't acquire through legal channels. And now you've been sent to the City. Apparently there's some sort of psychodimensional rift here, a portal allowing the inhabitants of the City access to one another's dreams. There also seems to be an abundance of mystic items in the City: items that may have come straight out of dreams. The Codex wants more information, and you're the man to get it. Given the unusual political situation at the moment—type Help Codex for more information—this is an excellent opportunity for you to move up in the ranks. Report to Codex HQ as soon as possible to get the update on the current situation.

As part of your cover, you have obtained a job as a waiter at the Bradbury Lounge, on Fifth street. In the first few days, you've noticed that there seems to be a private elevator going to a second level. A number of people seem to have the key, but you don't know what goes on up there. You also found a strange object under one of the tables—some sort of technical gizmo, but you have no idea what it does—which you pocketed for further study. (These are hooks to non-Codex plots)

Well, you have dreams to explore, and the Codex undoubtedly has work for you. Good luck!

A hotspot labeled "Special Abilities" links to a page which has clear explanations of Oliver's special abilities: Advanced Eavesdropping, Fast Talk, Pick Lock, and Sneak. Julian can also type "Help Codex" to access a page describing the history and mission of the Codex, the special resources it provides to its members, and its bitter feud with the other arms of Control. This sheet would further clarify the general goals of the Codex: to acquire ancient knowledge and items with magical powers, and to use this mystical knowledge to gain temporal power. It also gives Julian the location of the Codex headquarters.

At this point, Oliver appears in the streets of the City. He's already familiar with the basic movement and communication commands from the time he spent in The Sargasso Café. He could go to the Bradbury Lounge, where he could play a game, meet new people, and try to find out about the Club on the second floor. He could report in at Codex HQ, where he could meet some of the other members of the Faction and find out what the current goals of the Codex are. He could wander the streets of the City, or ask people about the strange gizmo he found. Or he could find a place to sleep and begin to explore the dream world.

Over the next two weeks, Oliver gets to know the other members of the Codex, and makes a few friends at the Ouija Lounge. He helps the Codex steal a powerful magical item from a secret society, the Twilight Lodge. He begins to develop hypnotic abilities in the dream world, which allow him to influence the actions of certain NPCs in the City. He uses these abilities to undermine the influence of Directive 12, an enemy arm of the Division; as a result, he gets a promotion, which gives him more money and access to restricted areas in Codex HQ. He finds out about New Xi City, the exclusive club above the Bradbury Lounge; applicants need to master the game Martian Chess, and Oliver starts to learn the game. The current leader of the Codex asks Oliver to infiltrate the Twilight Lodge, to see what else they know. And unknown to Oliver, a number of factions are searching for the alien gadget he still has in his pocket Directive 12 wants to find out who's been interfering with their plans. And the enigmatic Endymians are preparing to move against the Codex, to stop their meddling in the Sleeping Realms.

Dreams and Reality

Crossroads includes two worlds: the waking world—what we ink of as reality—and the Sleeping Realms, the world of dreams. Characters in Crossroads can move between these two worlds; the flavor of the game depends on which world the player is in.

Players begin in the waking world, generally referred to as the City. In the City, game action is straightforward, and game mechanics are intuitive and easy to understand. Players know what they can do and the capabilities of their characters rarely change. Likewise, the City itself remains constant While the City will expand with the addition of new areas, a player can always find his or her apartment, or favorite nightclub. The City is a place to meet others, to socialize, to play games and to talk. Action is more likely to involve espionage or intrigue than combat Players will struggle for position and control as secret societies work to accomplish their sinister goals, but on the surface, the City is a peaceful, safe place. The City is more about interaction than it is about action.

The Sleeping Realms are another story. The world of dreams is a place of mystery, of chaotic, unpredictable action. One of the continuing mysteries of the game will be the exploration of the Sleeping Realms, the quest to discover their true nature and their link to the waking world.

The rules governing combat and other actions in the dream world will be more complicated than those of the City. Players will have more abilities, and characters will be more dynamic, constantly gaining new items and abilities. A player enters the dream world for the first time is presented with a new list of characteristics and abilities—based on the character's traits and faction, but more detailed. As the character explores the dream world, he or she gains experience which can be used to improve skill ratings or develop supernatural powers. The meek scientist can be a mighty warrior in his dreams. Compared to the City, the Sleeping Realms can be dangerous, and combat and action are commonplace. Death in a dream usually only results in the character being forced out of the dream and waking up. But it can be quite difficult to find the way back to a particular spot upon returning to the dream.

The social environment of the City and the more action-oriented setting of the dream world will appeal to different types of player. The advantage is that players can choose which area they spend the majority of their time in. Of course, those players who are familiar with both worlds will get the most out of Crossroads.

In-Game Features

Character Abilities

Characters in Crossroads have many different sorts of abilities and skills. In general, players have more options while dreaming then they do while awake. Here is a brief sample of what players may be able to do:

Communication: There are many different types of mode of communication. Different factions have secret signals or languages which allow them to identify or communicate with other people in their faction. Equipment can give players additional communication options; a player with a cell phone can contact any other player with a phone . . . although eavesdroppers can listen in on half of the conversation. With advanced technology, players can gain other forms of communications that are more difficult to intercept Other characters can develop telepathic powers enabling them to communicate with other characters mind-to-mind.

Espionage: Sneaky characters have a variety of options, from eavesdropping and shadowing to picking pockets and various forms of burglary. But perceptive characters may spot a thief in the act, and security systems can make life quite difficult for the would-be burglar.

General Traits: Most traits operate in the background of the game. A character with the academic/science trait may be able to decipher alien technology or make use of scientific documents which are incomprehensible to other characters. A skilled gambler automatically reduces the AI level of computer opponents. In addition, non-player character will respond to certain traits. The dumb jock might have a grudge against academic characters . . . or perhaps it's the nutty professor who hates other academics, who "scorned his work".

Equipment: There is a wide range of gear available to players. Equipment will allow players to perform actions they otherwise could not A telephone lets a player contact characters in other parts of the City. A map makes it easier for him to find his way about the city. Weapons—hard to come by in the waking world—allow him to injure or kill other characters. A deck of cards can allow a character to play a game wherever he is. Alien gear or other advanced technology may grant characters even greater powers—teleportation, telepathy, or invisibility, to name a few.

Dream Powers: In dreams, characters will be able to develop far greater powers then they can possess in the waking world—supernatural abilities that might as well be called magic Increased combat abilities, the power to create weapons or other objects, extrasensory perception, teleportation, and many other powers will be available to dreamers. Eventually, dreamers may be able to reshape the very environment of the dream itself.

Character Affiliations

There are dozens of different groups which players can join or work with. These break down into a number of different categories.

Factions: These are the most secret and serious groups in the City. A player chooses a faction when he creates his character. The factions all have secret plans for the City, goals that conflict with those of the other factions. In addition, factions generally have structured hierarchies; the members of any given group will be engaged in a constant struggle for prestige and position. The player's faction usually gives him some sort of special abilities: skills, secret languages, or special equipment Sample factions include Directive 12, which seeks to control the City through manipulation of the political system, or the Olanza Imperium, aliens working to control Earth's economy.

Secret Societies: Small-scale factions, these groups are less exclusive and their goals are usually on a smaller scale than those of the factions. These groups are somewhat like the modern-day Shriners; they have secret rituals and meetings, but they will accept new members, and people on the street may have heard of them . . . even if they don't know what the society does. A player may be a member of multiple secret societies. Many factions actively work to infiltrate secret societies, to use them for their own ends. Joining a secret society may give a player minor new abilities—recognition signs, access to equipment or information—but these benefits will be on a smaller scale then those from a faction. A sample secret society would be the Order of the Twilight Lodge, whose members are all active explorers of Sleeping Realms.

Clubs: Clubs are exclusive organizations which are known to the public. Membership in a club usually requires some form of skill or talent, and the primary benefits of club membership are prestige, access to the club premises, and the company of like-minded individuals. A player can join any number of clubs, as long as she can meet the membership requirements. A sample dub would be the Aces Club, open only to those who have 100+ kills in Air Attack.

Connections: Players may have other connections which don't fit these categories, usually with less structured organizations. Academic characters may have access to University grounds. Some characters might be part of a secret race—aliens, or natives of the dream world—in addition to their faction.

Game Locations

There are many different types of places to visit in the City, each with its own functions and features. Clubs, coffeehouses and bars are places to socialize and play games. As noted above, some clubs may have specialized requirements for admission—skill at a particular game or esoteric knowledge of some sort Private residences are safe places to sleep or store equipment . . . most of the time. Laboratories and libraries allow certain types of research And shady areas allow access to black market equipment and less savory characters, if the player is willing to leave the safer areas of the City. In the dream world, there are more colorful locations: ornate temples, bleak plateaus, deep caverns, high school reunions where the player has no pants. While all locations in the City are connected, locations in the dream world are islands. The player is dropped in a random starting location when he goes to sleep, and it may not be the area he was hoping for. Some dreams are more pleasant than others . . . .

Non-Player Characters (NPCs)

The inhabitants of the City and its dreams also vary in their motives and capabilities. In the City, players can find opponents for the various games, contacts with valuable information, merchants (both illicit and above-board), crazy street people, and in the particularly bad areas, thieves and muggers. In the dreams, more bizarre creatures can be found: dragons, ghosts, talking animals and far stranger beings. Non-player characters can be a valuable source of information, or obstacles which must be overcome. The presence of scripted, computer-controlled non-player characters will ensure that there will always be characters on the MUD for players to interact with during low-traffic periods.

Crossroads will feature a new system which gives NPCs a far greater range of options than those found on current MUDs. Non-player characters will have the same capabilities as player characters, and will be able to respond to a variety of outside stimuli, including time, the presence of certain objects, and player actions or traits.

Embedded Games

Games are a central element of life in the City. Embedded games provide means for a player to gain wealth and status. They provide a means of direct head-to-head competition in the generally non-confrontational setting of the City.

DESCRIPTION OF THE PREFERRED EMBODIMENT

In accordance to the present invention, a massively multiplayer game is played using the Internet. The present invention will be explained below through the use of embodiment.

As previously outlined, the present game may be played by a very large number of players, using three-dimensional sound as well as text This original feature of the game is made possible by two technical innovations: increasing client-side functionality to minimize network traffic, and three-dimensional tracking of character and sound-source positions by the server.

Client-Side Functionality

Figure 1:
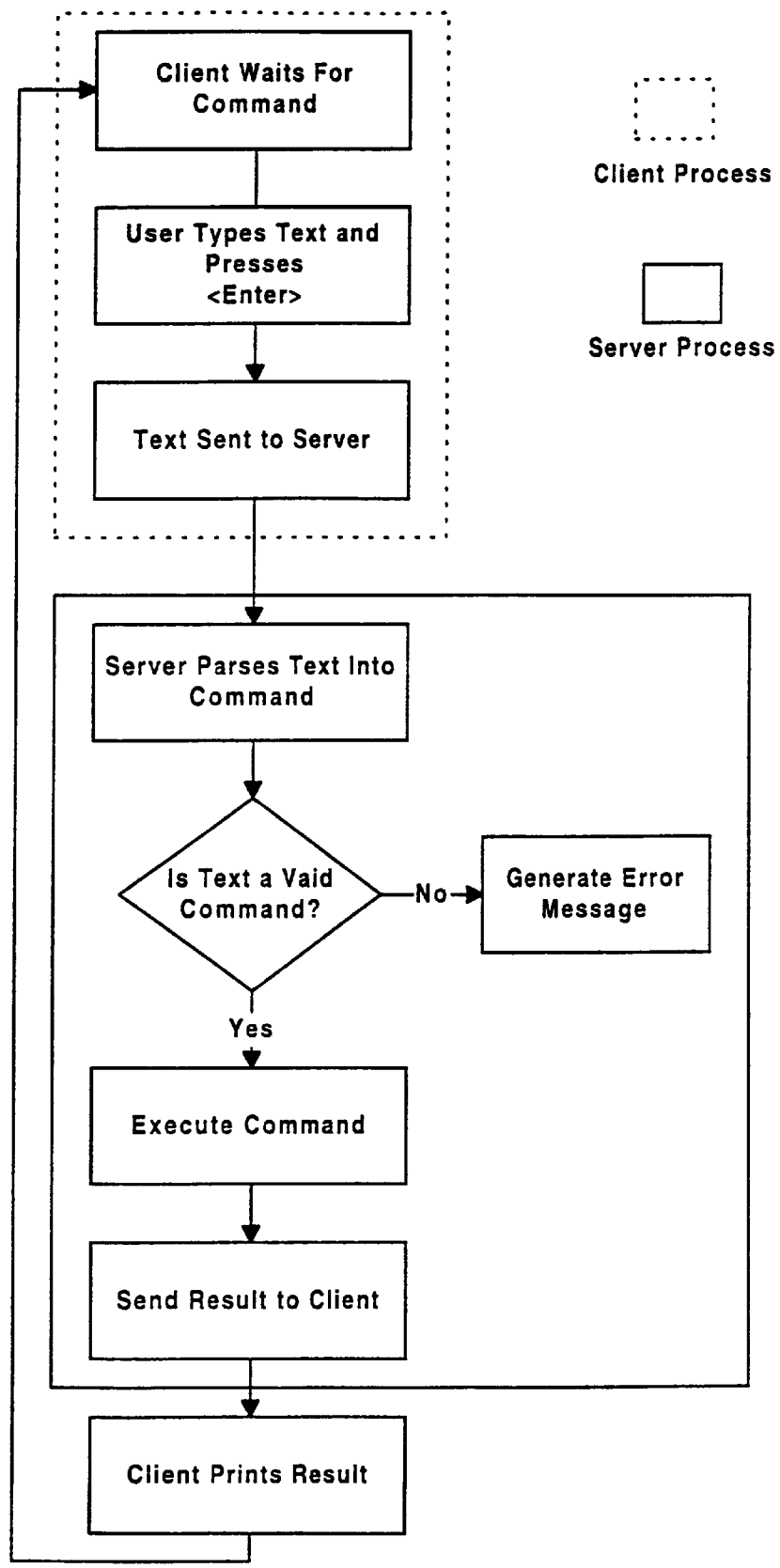
FIG. 1 Shows a diagram of the standard client/server data processing architecture for a multiplayer internet roleplaying game in the MUD genre.
Figure 2:
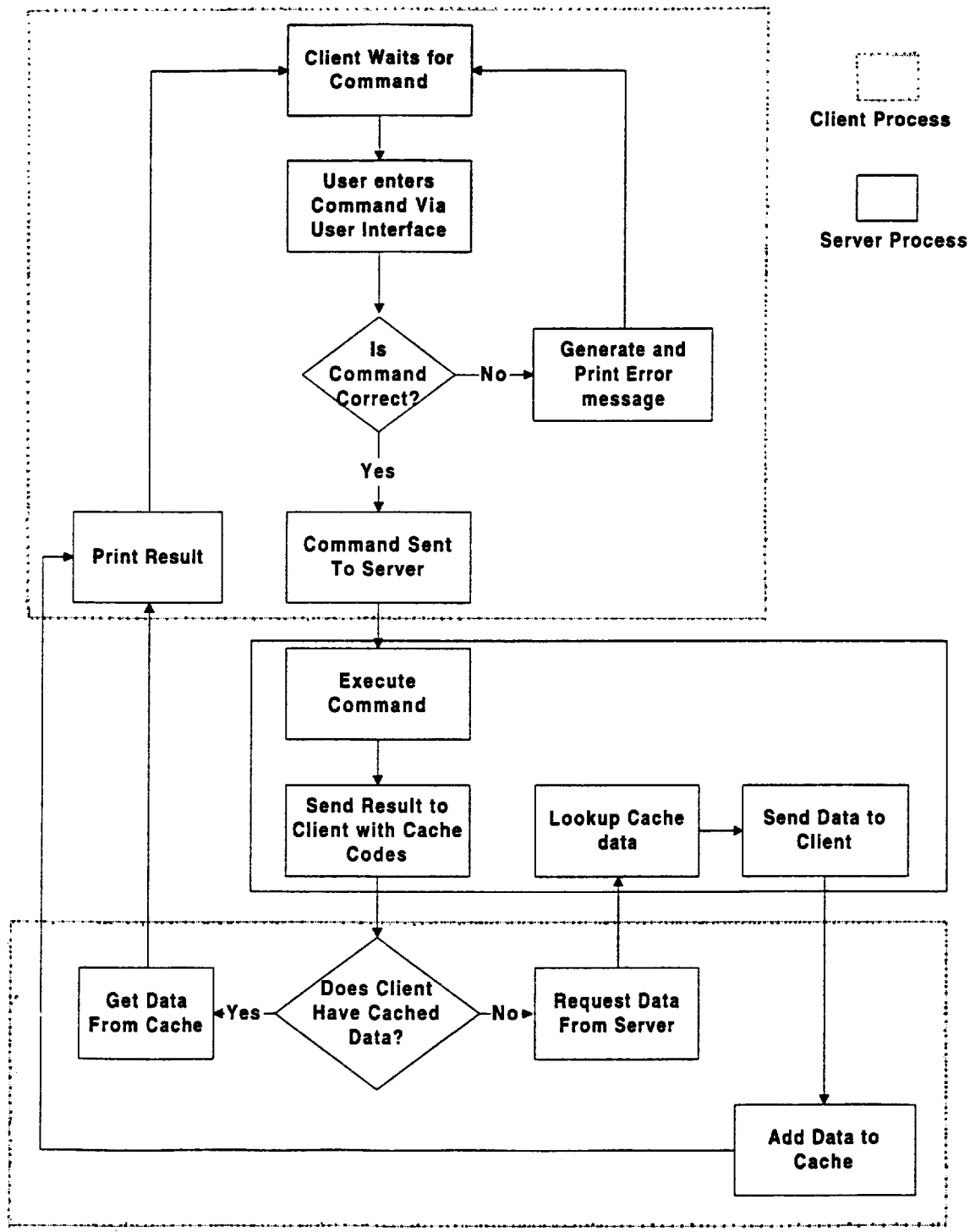
FIG. 2 Shows the client/server architecture developed for the present invention. By caching information on the client machine, this system removes the need for information to be sent from the server to the client more than once, significantly reducing the amount of information sent and received per player and producing a corresponding increase in speed and efficiency.

FIGS. 1 and 2 above respectively show the normal method of handling user input and client/server communications in text-based MUDs, and the method employed in the present invention Solid boxes outline server handled processes, dotted-line boxes outline client handled processes.

To optimize the efficiency of client/server communication, it is necessary to minimize the amount of data passed between the client and server, and minimize the amount of processing required by the server, since it is required to respond to all game participants. This is achieved by moving as much processing as possible from the server to the client.

Usually, a MUD client program is no more than a terminal: it can send inputted text to the server, and display text it receives from the server. The server essentially does everything, and the client software is highly generalized. Because the present invention is developed specifically for this particular type of game, optimizations can be made to improve overall game performance. The amount of data passed between client and server is minimized in three ways:

1. Error checking is performed on the client machine. When the user enters an invalid command, the error is detected, and a suitable error message is displayed, entirely on the client machine, whereas a standard MUD client program sends the invalid input from the client to the server, and then sends the error message from the server to the client.
2. Valid commands are compressed before being sent to the server. The client parses each command into a minimized form that both the client and server understand—for example, the command "equipment" might be sent as the number "10", reducing the size of the message in each direction.
3. Data is cached on the client machine. A large part of the data that is normally sent between client and server comprises object and sector descriptions, many of which are sent repetitively. According to the present invention, whenever the server wishes the client to display a description, it sends a number representing that object (2 bytes compared with up to 500 bytes for a full text description). The client refers to the cache and prints the description. If it does not find the description in its cache, it will request the description from the server at that time. Thus, no description is ever sent more than once.

This method reduced server processing as well as message size, because the server is not required to perform any error checking for user entered commands. It can always assume that input from the client is valid, so it only needs to execute it and send back the result.

Three-Dimensional Sound Tracking

Figure 3:
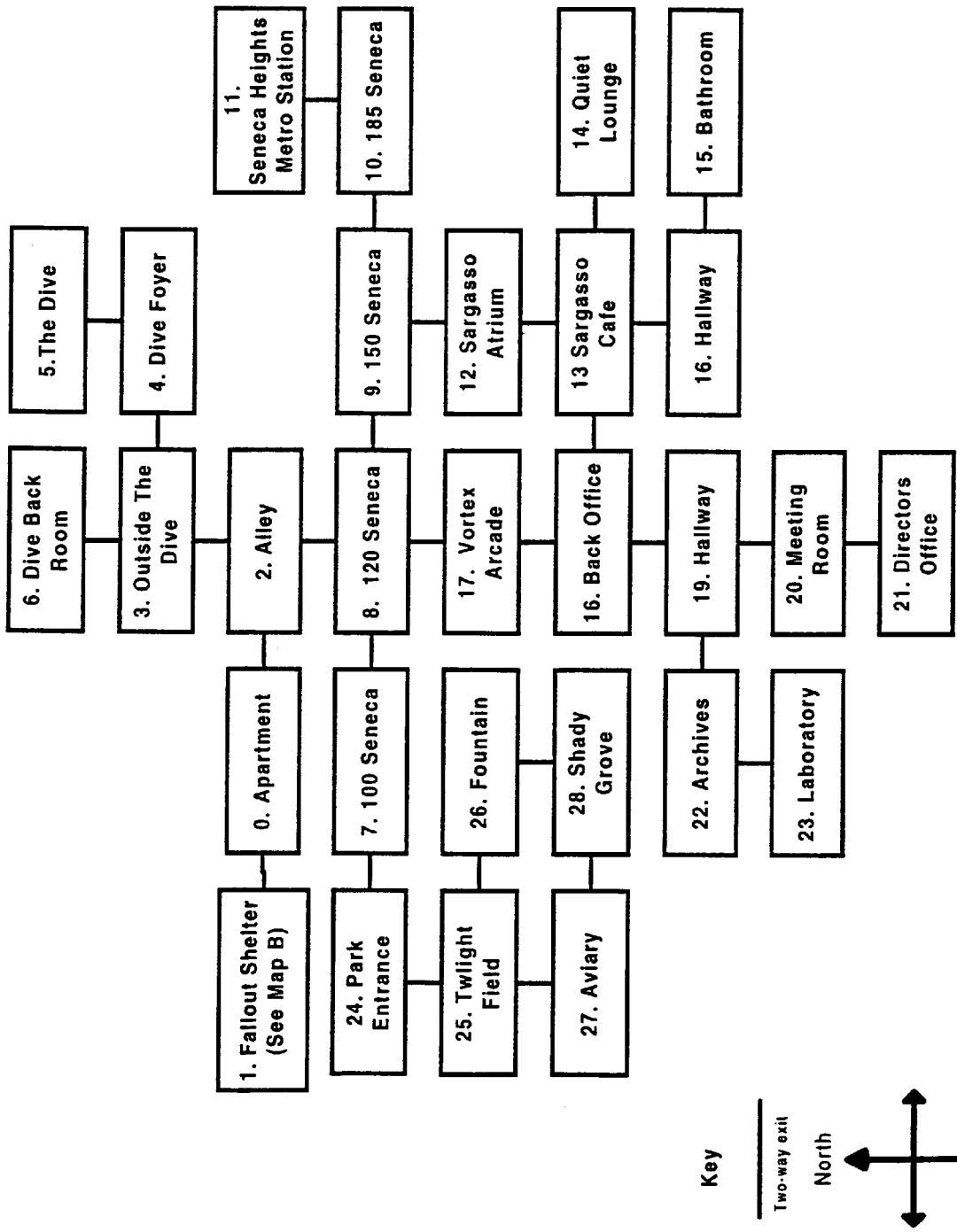
FIG. 3 Shows the division of a part of the virtual world into sectors, which are used to determine the location of any character and to determine the precise nature and content of the 3D sounds that are to be sent to the client Each sector is numbered for the server's reference.
Figure 4:
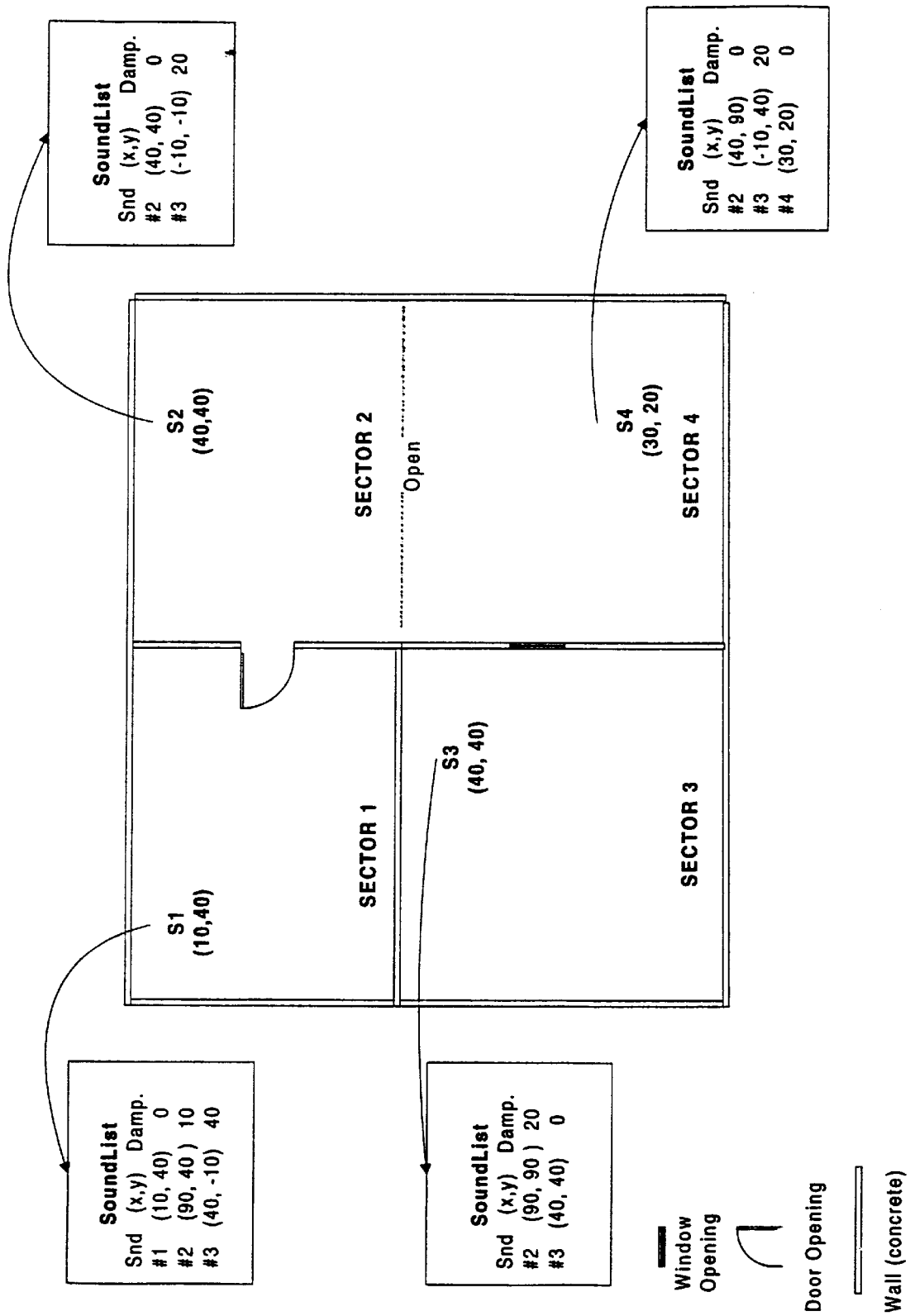
FIG. 4 Shows how 3D sounds are tracked by the server. The coordinates (x, y) represent the position of each audible sound source relative to a character who is in each sector. Damp represents the amount by which a sound source is dampened before being played to a player whose character is in the given sector.

FIG. 3 shows a typical part of the virtual world of the game, divided into sectors for the purpose of tracking the positions of characters and sound sources. The world is built, sector by sector, by the game's designer and development team; each sector corresponds to a single room or other bounded area, within which certain objects may be found and certain sounds may be heard, and from which the player has access to certain other sectors. FIG. 4 shows the relationship between four such sectors, each containing one object making a sound. Sounds 2 and 3 are loud sounds, so they can each be heard one sector away. Sounds 1 and 4 are only heard within the sector from which they originate. All coordinates in the diagram are relative to the lower left corner of each sector. Each sector is 50×50 units for the purposes of expressing coordinates.

The wall between sectors 1 and 2 is made of wood and has an open door. The wall between sectors 1 and 3 is made of solid concrete. The wall between sectors 3 and 4 is made of wood and has a closed door. There is no wall between sectors 2 and 4. Loud sounds are dampened to varying degrees by these separators, depending on their nature.

Each sector has a sound list which contains all sounds that can be heard by players in that sector, with coordinates relative to that sector's lower left corner.

The list is then used to determine how players hear sounds. For example, a player's character is positioned at position (25,25) in sector 1, facing north. The player hears sounds 1, 2 and 3. Relative to his position of (25,25), he hears them at (−15,15), (65,15) and (15,−35), respectively. Since concrete has a dampening value of 40, sound 3 is dampened by this value. Wood has a dampening value of 20, but since the door is open, sound 2 is only dampened by a value of 10.

The player enters the command "east" and the character moves to (25,25) in sector 2. This will update the positions of sounds 2 and 3, and the player will no longer hear sound 1 because it is not a loud sound and the character is no longer in the sector from which the sound originates. The server tells the client to update the position of sound 2 to (15,15), and sound 3 to (−35,−35). It also notifies the client that the character is now facing east, so the client software will rotate these coordinates accordingly before playing the sounds.

While the invention has been particularly shown and described with reference to a preferred embodiment, it will be understood by those skilled in the art that various changes in form or in detail may be made therein without departing from the spirit and scope of the invention.

It is claimed:

1. An apparatus for use in operating a computer-based game, comprising:
    a network structure for allowing multiple players to engage in a role playing game using the internet for data exchange; and
    a control system for establishing a virtual universe for said role playing game that can be accessed by any of said multiple players via the internet, said control system being operative for establishing at least one game character for each of said multiple players;
    said control system including:
        coordinate means for establishing a game coordinate system for defining the position of a particular game character and game objects;
        text means for receiving a text input from one of said multiple players, said text input allowing said particular name character of said one of said multiple players to move relative to said game coordinate system;
        sound creation means for establishing a set of game sounds related to said game objects:
        sound selection means for selecting a game sound associated with one of said game objects, for said particular game character based on a current relative geometry between said particular game character and said one of said game objects; and
        geometry-dependent sound production means for playing said game sound to said one of said multiple players based on said current relative geometry, wherein said game sound has a directional orientation that corresponds to said current relative geometry between said particular game character and said one of said game objects.

2. The apparatus of claim 1, wherein said sound production means comprises means for providing sounds having a directional orientation wherein said one of said multiple players perceives said sounds as coming from a selected location.

3. The apparatus as set forth in claim 2, wherein said sounds have a three-dimensional orientation.

4. The apparatus of claim 1, further comprising means for enabling new players to join a game in progress at any time without waiting for the start of a new game.

5. The apparatus of claim 1, further comprising means for providing a persistent game world wherein players make lasting changes.

6. The apparatus of claim 1, further comprising means to enhance the capabilities of the game by additions including one of new play operations, game resources, events relating to unfolding of a background story and unconnected events.

7. The apparatus of claim 1, further comprising means for recreating realistic three-dimensional audio to provide an enhanced user experience by allowing the user to hear sounds which are relevant to the game as they are heard in a real world environment.

8. The apparatus of claim 1, wherein said network structure comprises a game server for controlling the role playing game.

9. The apparatus of claim 1, wherein said control system provides two linked virtual worlds, each catering for a different style of play.

10. The apparatus of claim 1, further comprising means for creating a virtual environment where players interact socially with each other via their respective game characters.

11. The apparatus of claim 10, wherein three-dimensional audio is used to give a heightened sense of said virtual environment and of the position and movement of objects within the environment.

12. The apparatus of claim 1, further comprising means for accepting and processing text input via the internet from a number of players during a given time period and substantially continually updating the location and status of each player within said virtual universe, including any changes that have been made to the virtual universe by any player, and returning appropriately updated game information to each player in substantially real time, in the form of both text and audio.

13. The apparatus of claim 1, further comprising means for managing client-server communications and server processing by having the client software perform functions that do not specifically need to be addressed to the server, and by caching on a client machine location descriptions, sounds, and any other information which a player will access more than once.

14. An apparatus for use in operating a computer-based game, comprising:

means for receiving an input signal representative of data regarding said computer game from any of multiple players, said input signal representative of data being transmitted over a public network;

a processor for processing said input signal representative of data and outputting in substantially real-time audio information relating to said game in response to said input, said processor being operative for establishing at least one game character for each said multiple players; said processor including:

coordinate means for establishing a game coordinate system for defining the position of a game character and game objects;

sound creation means for establishing a set of game sounds related to said game object sound selection means for selecting a game sound, associated with one of said game objects, for said particular game character based on a current relative geometry between said particular game character and one of said same objects; and geometry-dependent sound production means for playing said game sound to one of said multiple players based on said current relative geometry, wherein said sound has a directional orientation that corresponds to said current relative geometry between said particular game character and said one of said game objects.

15. The apparatus of claim 14, wherein said processor comprises means for providing sounds having a directional orientation wherein said one of said multiple players perceives said sounds as coming from a selected location.

16. The apparatus of claim 15, wherein said sounds have a three-dimensional orientation.

17. The apparatus of claim 14, wherein said audio information is played to provide sounds having an orientation dependent upon a direction in which said particular game character is facing.

18. The apparatus of claim 14, wherein said means for receiving an input is operative for receiving text messages from any of said multiple players.

19. The apparatus of claim 1, wherein said audio information is played to provide sounds having an orientation dependent upon a direction in which said particular game character is facing.

20. A method for use in operating a computer-based game, comprising:

receiving an input regarding said computer game for any of multiple players, said input being transmitted over a public network;

establishing at least one game character for each of said multiple players;

establishing a game coordinate system for defining the position of a game character and game objects;

establishing a set of game sounds related to said game objects;

selecting a game sound, associated with one of said game objects, for said particular game character based on a current relative geometry between said particular game character and said one of said game objects; and playing said game sound to one of said multiple players based on said current relative geometry, wherein said sound has a directional orientation that corresponds to said current relative geometry between said particular game character and said one of said game objects.

21. The method of claim 20, further comprising the step of receiving a text input from said one of said multiple players, said text input allowing said particular game character of said one of said multiple players to move relative to said game coordinate system.

* * * * *